United States Patent
Holland et al.

(10) Patent No.: US 10,599,191 B2
(45) Date of Patent: Mar. 24, 2020

(54) SYSTEM AND METHOD OF MAKING A HOUSING FOR AN INFORMATION HANDLING SYSTEM

(71) Applicant: Dell Products L.P., Round Rock, TX (US)

(72) Inventors: Sacha Benjamin Holland, Campbell, CA (US); Yaotsung Chang, Taipei (TW); Kuo-hsiang Huang, New Taipei (TW)

(*) Notice: Subject to any disclaimer, the term of this patent is extended or adjusted under 35 U.S.C. 154(b) by 10 days.

(21) Appl. No.: 15/944,043

(22) Filed: Apr. 3, 2018

(65) Prior Publication Data
US 2019/0302839 A1 Oct. 3, 2019

(51) Int. Cl.
| | |
|---|---|
| G06F 1/16 | (2006.01) |
| B29C 45/00 | (2006.01) |
| B29C 45/44 | (2006.01) |
| B29K 55/02 | (2006.01) |
| B29L 31/34 | (2006.01) |

(52) U.S. Cl.
CPC .......... G06F 1/169 (2013.01); B29C 45/0017 (2013.01); B29C 45/4471 (2013.01); B29K 2055/02 (2013.01); B29L 2031/3481 (2013.01)

(58) Field of Classification Search
None
See application file for complete search history.

(56) References Cited

U.S. PATENT DOCUMENTS

| | | | | |
|---|---|---|---|---|
| 2010/0039375 A1* | 2/2010 | Huang | ................ | G06F 3/03547 345/156 |
| 2014/0267139 A1* | 9/2014 | Slaby | ..................... | G06F 3/044 345/174 |
| 2014/0339062 A1* | 11/2014 | Glad | ..................... | G06F 1/1643 200/343 |
| 2016/0147328 A1* | 5/2016 | Doi | ......................... | G06F 1/169 345/157 |

* cited by examiner

*Primary Examiner* — Christopher J Kohlman
(74) *Attorney, Agent, or Firm* — Baker Botts L.L.P.

(57) ABSTRACT

In one or more embodiments, one or more systems, methods, and/or processes may inject material into a mold for a housing of an information handling system through at least one cavity for at least one pivot and through multiple positions adjacent to a clickpad cavity to create a clickpad portion of the housing; may create multiple bridges at multiple positions that bind the clickpad portion of the housing to other portions of the housing; and may remove the multiple bridges to permit the clickpad portion of the housing to rotate about the at least one pivot. For example, the housing of the information handling system, the at least one pivot, and the clickpad holder may be formed of a unitary material. For instance, the unitary material may be or include a polymer.

20 Claims, 7 Drawing Sheets

SYSTEM AND METHOD OF MAKING A HOUSING FOR AN INFORMATION HANDLING SYSTEM

BACKGROUND

Field of the Disclosure

This disclosure relates generally to information handling systems and more particularly to housings of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may inject material into a mold for a housing of an information handling system through at least one cavity for at least one pivot and through multiple positions adjacent to a clickpad cavity to create a clickpad portion of the housing; may create multiple bridges at multiple positions that bind the clickpad portion of the housing to other portions of the housing; and may remove the multiple bridges to permit the clickpad portion of the housing to rotate about the at least one pivot. In one example, removing the multiple bridges may include cutting the multiple bridges away from the clickpad portion of the housing. In another example, removing the multiple bridges may include burning the multiple bridges away from the clickpad portion of the housing. In one or more embodiments, the at least one pivot may be a single pivot or may be multiple pivots. For example, the at least one pivot may be formed of multiple pivots.

In one or more embodiments, the one or more systems, methods, and/or processes may further couple a printed circuit board to a first side of the clickpad portion of the housing. In one example, the printed circuit board may be coupled to the first side of the clickpad portion of the housing via an adhesive material. In another example, the printed circuit board may be coupled to the first side of the clickpad portion of the housing via a fastener. In one or more embodiments, the one or more systems, methods, and/or processes may further couple a pad to a second side of the clickpad portion of the housing. For example, the pad may include at least one of a Mylar pad, a glass pad, and a paint material, among others. In one or more embodiments, the pad may be coupled to a second side of the clickpad portion of the housing via an adhesive material. In one or more embodiments, the material injected into the mold for the housing of the information handling system may include a polymer. For example, the polymer may include at least one of an Acrylonitrile butadiene styrene (ABS) material, a thermoplastic polymer, and a thermosetting polymer, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
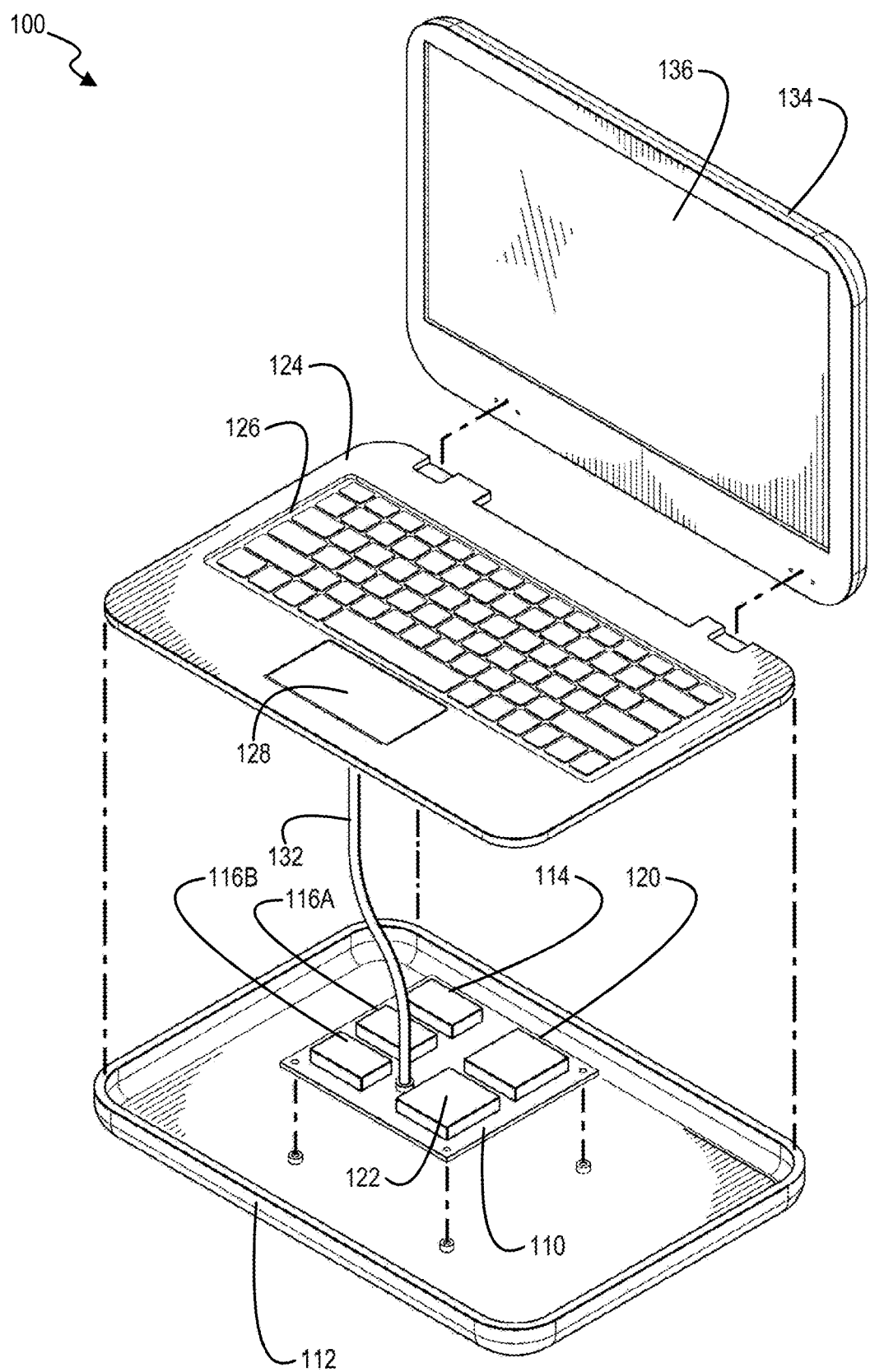
FIG. 1 illustrates an exploded view that illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a housing of an information handling system may be formed via an injection molding process. In one or more embodiments, the housing of the information handling system may include a clickpad holder and at least one pivot that permits the clickpad holder to rotate relative to the housing. For example, the housing of the information handling system, the at least one pivot, and the clickpad holder may be formed of a unitary material. For instance, the unitary material may be or include a polymer. In one or more embodiments, a polymer may include one or more of an Acrylonitrile butadiene styrene (ABS) material, a thermoplastic polymer, and a thermosetting polymer, among others. In one or more embodiments, the at least one pivot may be a single pivot or may be multiple pivots.

In one or more embodiments, forming the housing of the information handling system, the clickpad holder, and the at least one pivot of a unitary material may reduce one or more components and/or reduce one or more assembly steps. In one example, forming the housing of the information handling system, the clickpad holder, and the at least one pivot of a unitary material may reduce component stacking. In another example, forming the housing of the information handling system, the clickpad holder, and the at least one pivot of a unitary material may reduce an assembly step of joining a separate clickpad holder in an assembly process.

Turning now to FIG. 1, an example of an exploded view that illustrates an example of an information handling system is illustrated, according to one or more embodiments. An information handling system (IHS) 100 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 100 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 100 may include or have a form factor of that of or similar to one or more of a laptop, a notebook, a telephone, a tablet, and a PDA, among others. For example, a portable IHS 100 may be readily carried and/or transported by a user (e.g., a person). In one or more embodiments, components of IHS 100 may include one or more storage devices, one or more communications ports for communicating with external devices as well as various input and output (I/O) devices, such as a keyboard, a mouse, and a video display, among others. In one or more embodiments, IHS 100 may include one or more buses operable to transmit communication between or among two or more hardware components.

As shown, IHS 100 may include a motherboard 110 and a housing 112 that may hold motherboard 110. As illustrated, motherboard 110 may include processing components. In one or more embodiments, the processing components may include one or more processors 114, a storage 116, a chipset 120, and an interface system 122, among others. In one or more embodiments, components 116-122 may be communicatively coupled to one or more processor 114. As shown, IHS 100 may include a housing 124 that may integrate one or more of a keyboard 126 and a touchpad 128. As illustrated, IHS 100 may include a coupling 132 that may communicatively couple and/or interface one or more of keyboard 126 and touchpad 128 with one or more of motherboard 110 and information handling system components 114-122. As shown, a lid 134 may rotationally couple to housing 124 and may integrate a display 136.

In one or more embodiments, storage 116 may include volatile and persistent storage media, fixed and removable media, and magnetic and semiconductor media, among others. In one example, storage 116 may be or include one or more memory media. In a second example, storage 116 may include storage media such as non-transitory computer-readable media that stores, for at least a period of time, data and instructions, such as executable code. In another example, storage 116 may include storage media such as a direct access storage device, including a hard disk drive, a sequential access storage device, such as flash memory, electrically erasable programmable read-only memory (EEPROM), a tape disk drive, compact disk (CD), random access memory (RAM), read-only memory (ROM), CD-ROM, digital versatile disc (DVD), and non-transitory media, among others, and/or one or more combinations of the foregoing.

In one or more embodiments, storage 116 may include processor instructions executable by one or more processors 114. In one example, one or more of an application and an operating system, among others, may include processor instructions executable by one or more processors 114. For instance, the one or more of the application and the operating system may process information, when executed by one or more processors 114. In another example, processor 114 may execute the processor instructions to implement one or more systems, processes, and/or methods described herein. For instance, the processor instructions may be configured, coded, and/or encoded with instructions in accordance with one or more of flowcharts, methods, and/or processes described herein. In one or more embodiments, one or more of a storage medium and a memory medium may be or include a software product, a program product, and/or an article of manufacture. For example, the software product, the program product, and/or the article of manufacture may be configured, coded, and/or encoded with instructions, executable by a processor, in accordance with one or more of flowcharts, methods, and/or processes described herein. For instance, the instructions may be executable by one or more of processors 114.

In one or more embodiments, processor instructions may be utilized to receive and/or process interaction data from touchpad 128. For example, a device driver may be utilized to receive and/or process interaction data from touchpad 128. In one instance, the device driver may be included in an operating system. In another instance, the device driver may be loaded into the operating system. In one or more embodiments, processor instructions may not be available to receive and/or process interaction data from touchpad 128. In one example, a device driver may not be included in an operating system. In a second example, the device driver may not be loaded in the operating system. In another example, the processor instructions that may be utilized to receive and/or process interaction data from touchpad 128 may not have been created and/or implemented. For instance, the processor instructions that may be utilized to receive and/or process interaction data from touchpad 128 may not have ever been created and/or implemented or may not have been created and/or implemented for one or more of a specific processor, a specific operating system, and a specific version of an operating system, among others.

In one or more embodiments, processor instructions and/or hardware may be utilized to receive and/or process interaction data from a device different from touchpad 128 or a device similar to touchpad 128 utilizing data and/or a protocol different from that utilized by touchpad 128. For example, the processor instructions and/or hardware that may be utilized to receive and/or process interaction data from the different device or the similar device utilizing the data and/or the protocol different from that utilized by touchpad 128 may include processor instructions and/or hardware may be utilized to receive and/or process interaction data associated with a PS/2 interface and/or device. For instance, the processor instructions may include a device driver that may be utilized to receive and/or process interaction data associated with a PS/2 interface and/or device, and a hardware device may provide interaction data of touchpad 128 to one or more processors 114 via interaction data associated with a PS/2 interface and/or device.

In one or more embodiments, touchpad 128 may utilize a data format (e.g., a communication protocol) that may be utilized to encode and/or convey to another device that may interact with touchpad 128. For example, touchpad 128 may sense interaction, may transform the interaction into interaction data, and may utilize the data format to encode and/or convey the interaction data. In one instance, touchpad 128 may sense interaction, transform the interaction into horizontal and vertical (e.g., X/Y) data, and utilize the data format to encode and/or convey the interaction data. In a second instance, touchpad 128 may sense interaction, transform the interaction into scroll (e.g., scroll left, scroll right, scroll up, scroll down, etc.) data, and utilize the communication protocol to encode and/or convey the scroll data. In a third instance, touchpad 128 may sense interaction, transform the interaction into zoom (e.g., zoom-in, zoom-out, etc.) data, and utilize the data format to encode and/or convey the zoom data. In another instance, touchpad 128 may sense interaction, transform the interaction into rotate (e.g., rotate clockwise, rotate counterclockwise, etc.) data, and utilize the data format to encode and/or convey the rotate data. In one or more embodiments, touchpad 128 may sense interaction, transform the interaction into data associated with another gesture, and utilize the data format to encode and/or convey the other gesture data.

Although IHS 100 illustrated in FIG. 1 provides an exemplary information handing system, an information handling system may include an hardware resource or aggregate of hardware resources operable to compute, classify, process, transmit, receive, retrieve, originate, switch, store, display, manifest, detect, record, reproduce, handle, or utilize various forms of information, intelligence, or data for business, scientific, control, entertainment, or other purposes, according to one or more embodiments. For example, IHS 100 may include memory, one or more processing resources such as one or more processors, hardware control logic, and/or software control logic. In one or more embodiments, components of IHS 100 may include one or more storage devices, one or more communications ports for communicating with external devices as well as various input and output (I/O) devices, such as a keyboard, a mouse, and a video display, among others. In one or more embodiments, IHS 100 may include one or more buses configured and/or operable to transmit communication between the various hardware components.

In one or more embodiments, IHS 100 may include firmware for controlling or communicating with, for example, hard drives, network circuitry, memory devices, I/O devices, and other peripheral devices. For example, firmware may include software embedded in an information handling system component used to perform tasks. In one or more embodiments, firmware may be stored in non-volatile memory, or storage that does not lose stored data upon the loss of power. In one example, firmware associated with an information handling system component may be stored in non-volatile memory that is accessible to one or more information handling system components. In another example, firmware associated with an information handling system component may be stored in non-volatile memory that may be dedicated to and includes part of that component. For example, an embedded controller may include firmware that may be stored via non-volatile memory that may be dedicated to and includes part of the embedded controller.

Figure 2A:
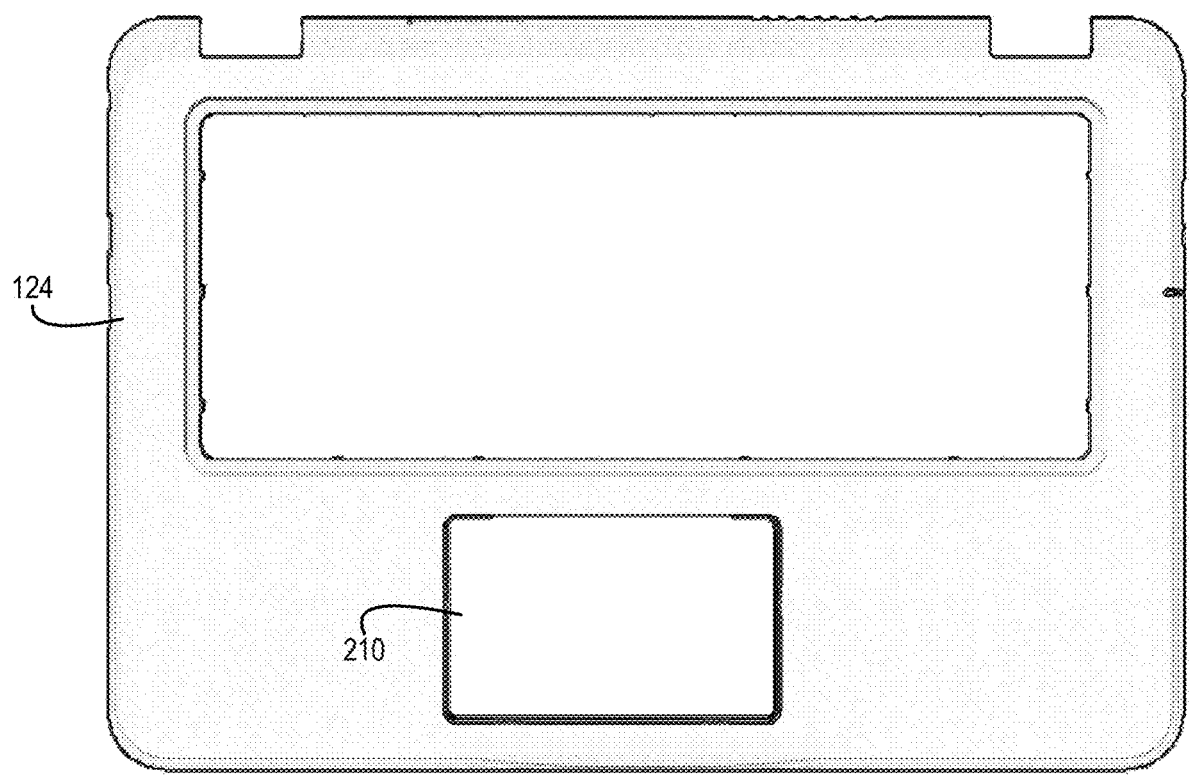
FIG. 2A illustrates an example housing that includes an example clickpad holder, according to one or more embodiments.

Turning now to FIG. 2A, an example housing that includes an example clickpad holder is illustrated, according to one or more embodiments. As shown, housing 124 may include a clickpad holder 210. In one or more embodiments, clickpad holder 210 may be molded into housing 124. For example, clickpad holder 210 and housing 124 may be molded in a single molding process. For instance, clickpad holder 210 and housing 124 may be molded in an injection single molding process. In one or more embodiments, housing 124 may include at least one of an Acrylonitrile butadiene styrene (ABS) material, a thermoplastic polymer, and a thermosetting polymer, among others. For example, housing 124 may be produced via an injection molding process. For instance, housing 124 may be produced via an injection molding process that utilizes at least one of an ABS material, a thermoplastic polymer, and a thermosetting polymer, among others, to create housing 124.

Figure 2B:
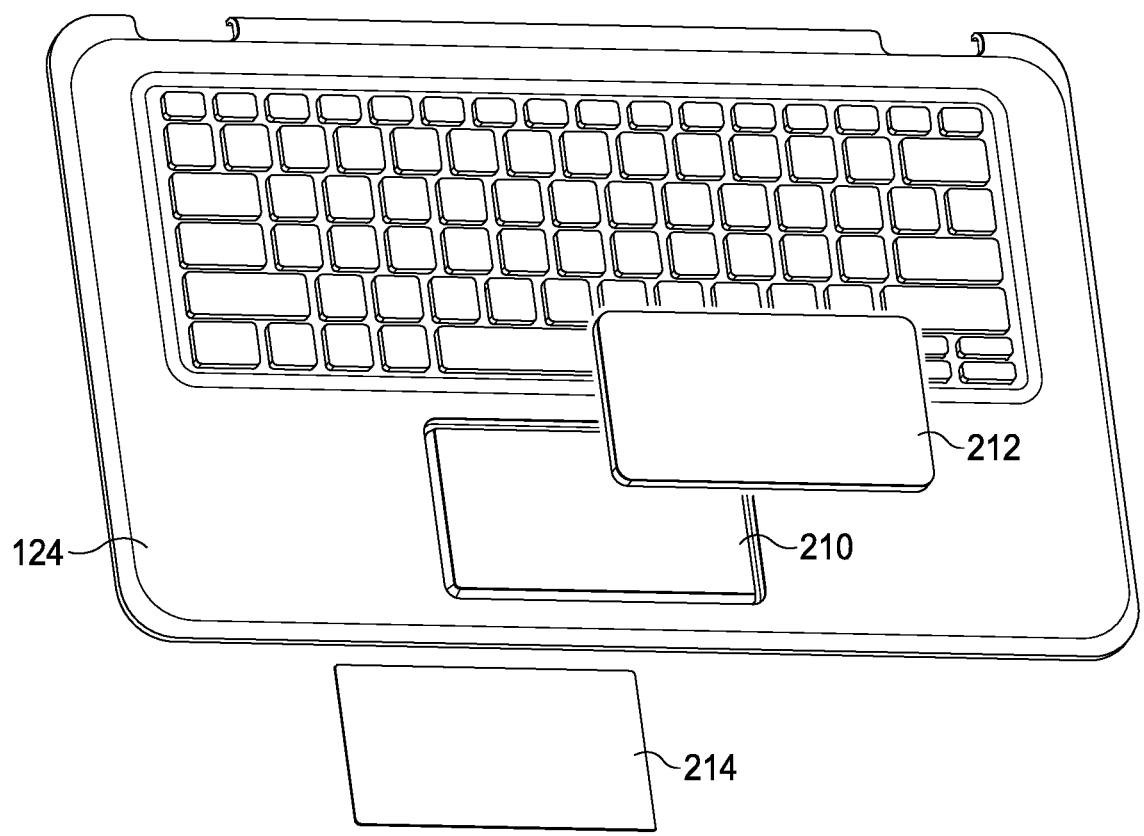
FIG. 2B illustrates an example housing, an example clickpad holder, an example cosmetic surface, and an example clickpad printed circuit board, according to one or more embodiments.

Turning now to FIG. 2B, an example housing, an example clickpad holder, an example, cosmetic surface, and an example clickpad printed circuit board are illustrated, according to one or more embodiments. In one or more embodiments, a pad 212 may be coupled to clickpad 210. In one or more embodiments, pad 212 may be or include at least one of a Mylar material, glass, and a paint material, among others. In one example, pad 212 may be a Mylar pad. For instance, the Mylar pad may be painted with a paint material. In another example, pad 212 may be a glass pad. In one or more embodiments, pad 212 may be a sprayed-on material. Other materials for pad 212 may be utilized, according to one or more embodiments. In one or more embodiments, pad 212 may be cosmetic.

As illustrated, a printed circuit board (PCB) 214 may be coupled to clickpad holder 210 or proximate to clickpad holder 210. In one or more embodiments, PCB 214 may include circuitry that receives "clicks" and/or user finger movements on pad 212. In one example, PCB 214 may include circuitry that receives an actuation of a button that indicates a "click" of an input device. In a second example, PCB 214 may include an electronic accelerometer that receives an actuation of a button that indicates a "click" of an input device. In another example, PCB 214 may include circuitry that receives movements of one or more fingers, of a user, across pad 212. For instance, circuitry that receives movements of one or more fingers across pad 212 may include capacitive sensing circuitry that receives movements of one or more fingers across pad 212. In one or more embodiments, PCB 214 may be communicatively coupled to one or more processors 114. For example, PCB 214 may provide data, indicating one or more fingers across pad 212 and/or one or more "clicks", to one or more processors 114. For instance, PCB 214 may include circuitry that may determine at least one position of at least one digit of a user, relative to the clickpad holder, and PCB 214 may include circuitry that may provide, to one or more processors 114, the at least one position of the at least one digit of the user. In one or more embodiments, instructions, when executed by the one or more of processors 114, cause the information handling system to receive data, from PCB 214, associated with the at least one position of the at least one digit of the user and provide the data associated with the at least one position of the at least one digit of the user to an application executed by one or more of processors 114. In one or more embodiments, clickpad 210, pad 212, and PCB 214 may form touchpad 128. In one or more embodiments, touchpad 128 may include one or more of clickpad 210, pad 212, and PCB 214, among others.

Figure 2C:
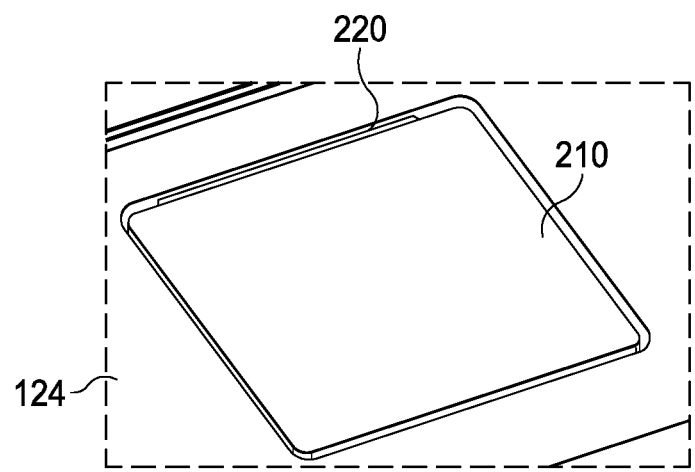
FIG. 2C illustrates an example clickpad holder, according to one or more embodiments.

Turning now to FIG. 2C, an example clickpad holder is illustrated, according to one or more embodiments. As shown, clickpad holder 210 may be coupled to housing 124 via pivot 220. In one or more embodiments, pivot 220 may function as a hinge. For example, pivot 220 may function as a hinge between housing 124 and clickpad holder 210. In one or more embodiments, housing 124, clickpad holder 210, and pivot 220 may be formed of a unitary material. For example, although housing 124, clickpad holder 210, and pivot 220 may be formed of a unitary material, pivot 220 may function as a hinge between housing 124 and clickpad holder 210.

Figure 2D:
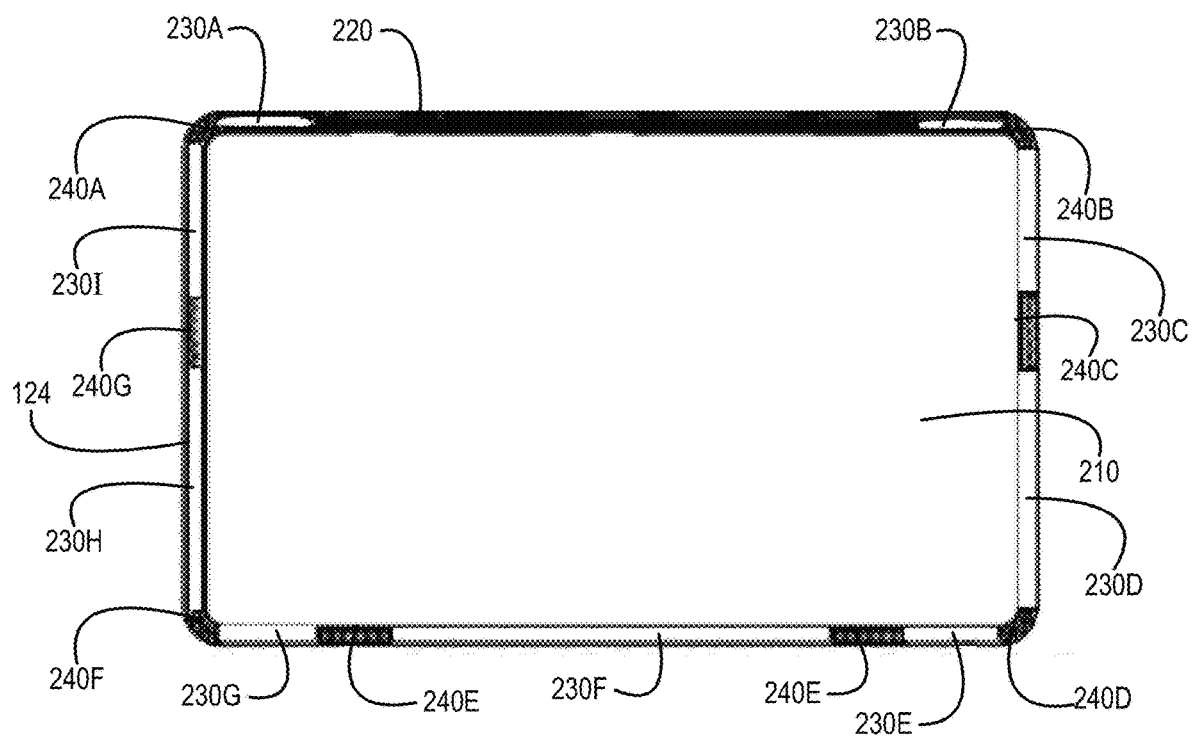
FIG. 2D illustrates examples clickpad holder with a single pivot, according to one or more embodiments.
Figure 2E:
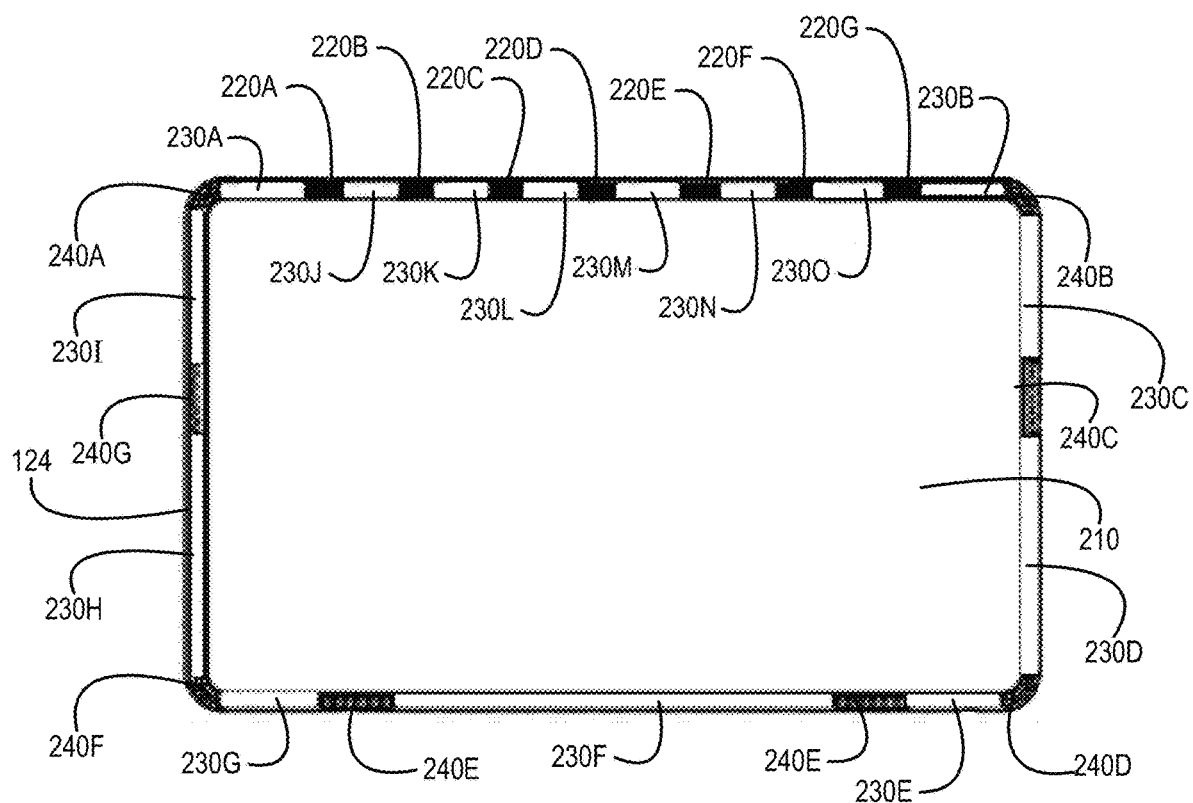
FIG. 2E illustrates examples clickpad holder with multiple pivots, according to one or more embodiments.

Turing now to FIGS. 2D and 2E, examples clickpad holders are illustrated, according to one or more embodiments. As shown, clickpad holder 210 may be coupled to housing 124 via bridges 240A-240G. In one or more embodiments, bridges 240A-240G may be utilized in a molding process of housing 124 and clickpad holder 210. In one example, bridges 240A-240G may provide support during the molding process of housing 124 and clickpad holder 210. In another example, bridges 240A-240G may provide one or more areas where material (e.g., plastic material) may be injected during the molding process. For instance, a bridge 240 may be or include a gate of an injection molding process. In one or more embodiments, bridges 240A-240G may provide support for bonding clickpad PCB 214 and/or a clickpad to clickpad holder 210. For example, bridges 240A-240G may provide support to clickpad holder 210 while one or more of pad 212 and clickpad PCB 214 are coupled to clickpad holder 210.

In one or more embodiments, bridges 240A-240G may be eliminated and/or removed.

For example, bridges 240A-240G may be cut off or cut through. In one instance, eliminating bridges 240A-240G may permit and/or allow clickpad holder 210 to rotate and/or pivot utilizing pivot 220, as illustrated in FIG. 2D. In another instance, eliminating bridges 240A-240G may permit and/or allow clickpad holder 210 to rotate and/or pivot utilizing pivots 220A-220G, as shown in FIG. 2E. In one or more embodiments, a hole or cavity 230 may be formed. For example, holes 230 may be formed via a molding process that produces housing 124. In one instance, a hole or cavity 230 may be formed between two bridges 240. In a second instance, a hole or cavity 230 may be formed between a bridge 240 and a pivot 220. In another instance ample, a hole or cavity 230 may be formed between two pivots 220.

Figure 2F:
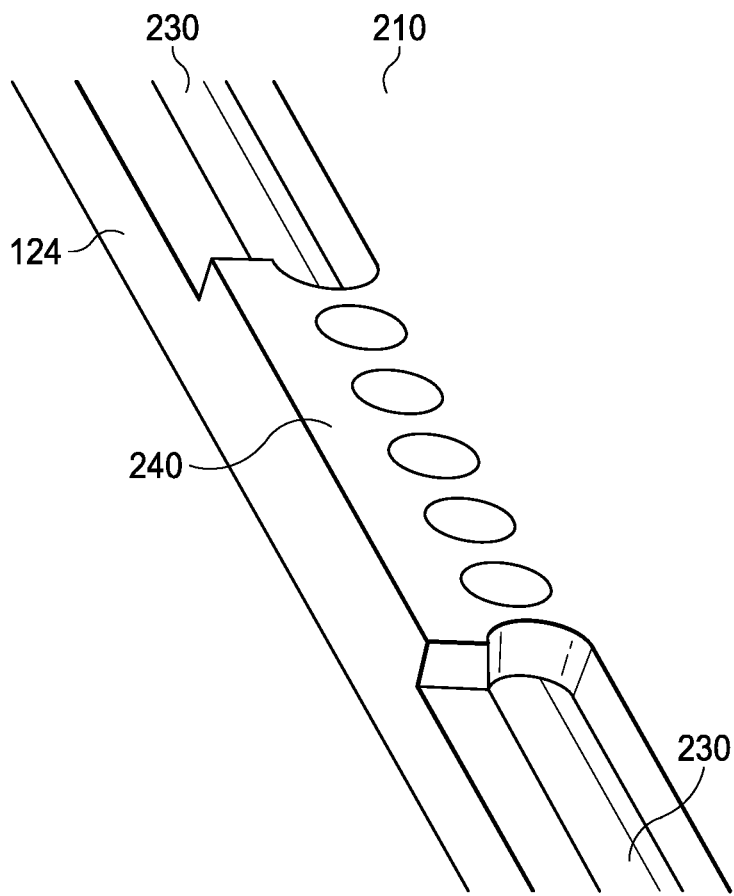
FIG. 2F illustrates a more detailed view of an example of a bridge, according to one or more embodiments.

Turning now to FIG. 2F, a more detailed view of an example of a bridge is illustrated, according to one or more embodiments. In one or more embodiments, housing 124 and clickpad holder 210 may be formed in a single molding process. For example, housing 124 and clickpad holder 210 may be formed in a single injection molding process. In one instance, eliminating bridges 240A-240G may permit and/or allow clickpad holder 210 to rotate and/or pivot utilizing pivot 220 while still being a part of housing 124. In another instance, eliminating bridges 240A-240G may permit and/or allow clickpad holder 210 to rotate and/or pivot utilizing pivots 220A-220F while still being a part of housing 124. In one or more embodiments, bridge 240 may be eliminated and/or removed. For example, bridge 240 may be eliminated and/or removed after a molding process that produces clickpad holder 210 and housing 124.

Figure 2G:
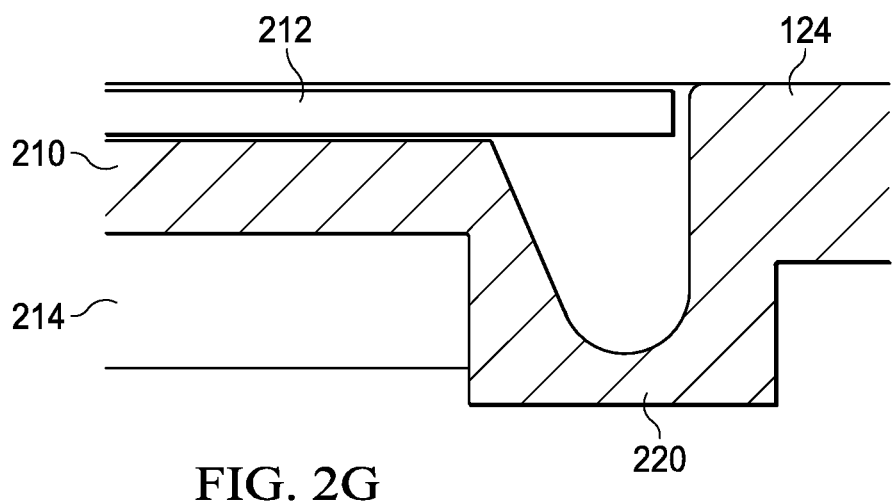
FIG. 2G illustrates an example of a cross section of a housing and clickpad holder, according to one or more embodiments.

Turning now to FIG. 2G, an example of a cross section of a housing and a clickpad holder is illustrated, according to one or more embodiments. As shown, pad 212, clickpad holder 210, and housing 124 may be formed of a unitary material. As illustrated, pad 212 may be coupled to clickpad holder 210. As shown, PCB 214 may be coupled to clickpad holder 210. In one or more embodiments, a thickness of pivot 220 may be configured. In one or more embodiments, a resistance to movement and/or rotation of clickpad 210 may be based at least on a thickness of pivot 220. For example, clickpad holder 210 may rotate and/or pivot for "clicking" as if actuating button.

Figure 3:
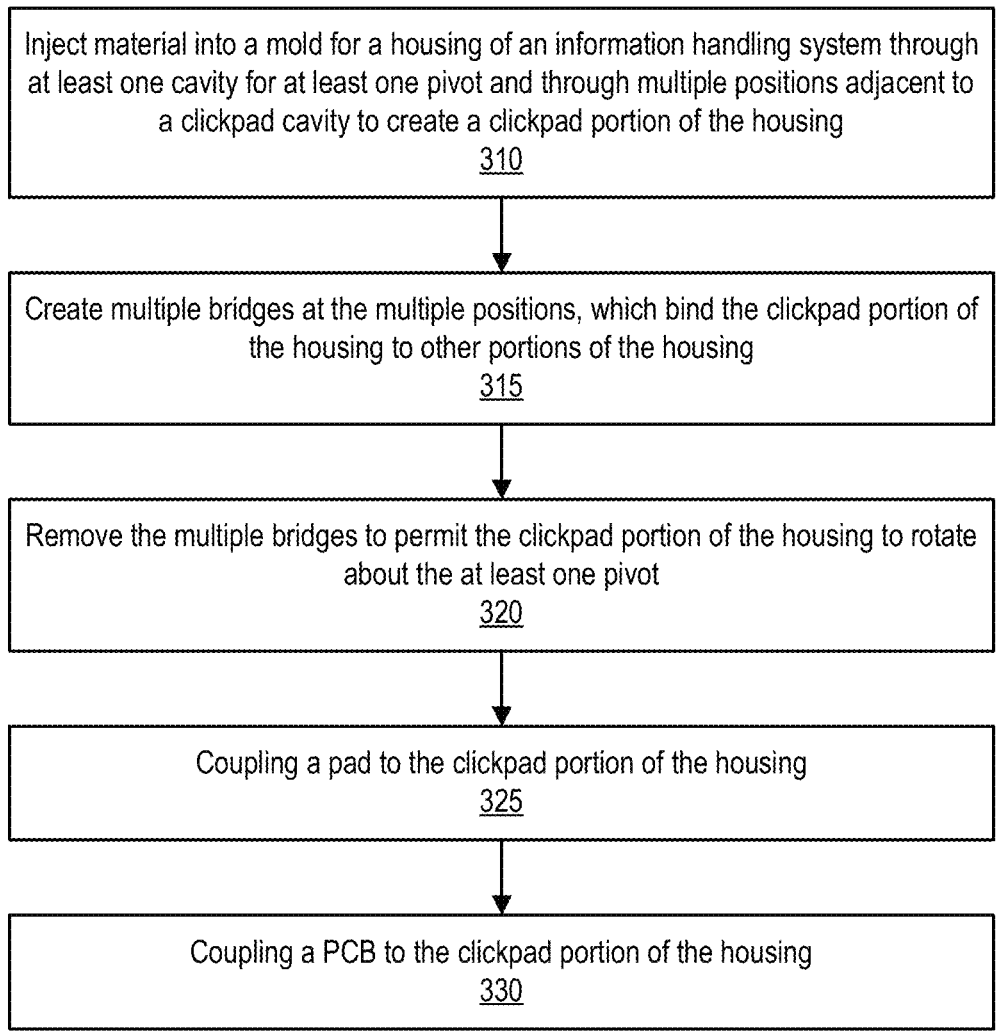
FIG. 3 illustrates an example of a method of manufacturing a housing, according to one or more embodiments.

Turning now to FIG. 3, an example of a method of manufacturing a housing is illustrated, according to one or more embodiments. At 310, material may be injected into a mold for a housing of an information handling system through at least one cavity for at least one pivot and through multiple positions adjacent to a clickpad cavity to create a clickpad portion of the housing. In one example, material may be injected into a mold for a housing of an information handling system through at least one cavity for pivot 220. For instance, material may be injected into a mold for a housing of an information handling system through at least one cavity for pivot 220, illustrated in FIG. 2D. In a second example, material may be injected into a mold for a housing of an information handling system through multiple cavities for two or more of pivots 220A-220G, illustrated in FIG. 2E. In another example, material may be injected into a mold for a housing of an information handling system through multiple positions adjacent to a clickpad cavity to create a clickpad portion of the housing. For instance, the multiple positions adjacent to the clickpad cavity may be associated with bridges 240.

In one or more embodiments, the material that may be injected into the mold for the housing of the information handling system may include a polymer. For example, the polymer may include at least one of an Acrylonitrile butadiene styrene (ABS) material, a thermoplastic polymer, and a thermosetting polymer, among others. In one instance, a thermoplastic polymer may include at least one of nylon, polyethylene, and polystyrene, among others. In another instance, a thermoplastic polymer may include at least one of epoxy and phenolic, among others.

At 315, multiple bridges at the multiple positions, that bind the clickpad portion of the housing to other portions of the housing, may be created. In one or more embodiments, injecting the material at the multiple positions adjacent to the clickpad cavity may create bridges 240. At 320, the multiple bridges may be removed to permit the clickpad portion of the housing to rotate about the at least one pivot. In one example, multiple bridges may be removed via machining the multiple bridges away. In one instance, machining the multiple bridges away may include grinding and/or abrading the multiple bridges away. In another instance, machining the multiple bridges away may include cutting the multiple bridges away. In another example, multiple bridges may be removed via burning the multiple bridges away. For instance, the multiple bridges may be burned away via a laser. In one or more embodiments, burning the multiple bridges away via a laser may include cutting the multiple bridges away via the laser.

At 325, a pad may be coupled to the clickpad portion of the housing. For example, clickpad 212 may be coupled to clickpad holder 210. In one or more embodiments, coupling a pad to the clickpad portion of the housing may include adhering the pad to the clickpad portion of the housing. For example, an adhesive material may be utilized to couple the pad to the clickpad portion of the housing. For instance, an adhesive material may be applied to one or more of clickpad 212 and clickpad holder 210. In one or more embodiments, coupling a pad to the clickpad portion of the housing may include fastening the pad to the clickpad portion of the housing. For example, one or more fasteners may be utilized in coupling the pad to the clickpad portion of the housing.

At 330, a PCB may be coupled to the clickpad portion of the housing. For example, PCB 214 may be coupled to clickpad holder 210. In one or more embodiments, coupling a PCB to the clickpad portion of the housing may include adhering the PCB to the clickpad portion of the housing. For example, an adhesive material may be utilized to couple the PCB to the clickpad portion of the housing. For instance, an adhesive material may be applied to one or more of PCB 214 and clickpad holder 210. In one or more embodiments, coupling a PCB to the clickpad portion of the housing may include fastening the PCB to the clickpad portion of the housing. For example, one or more fasteners may be utilized in coupling the PCB to the clickpad portion of the housing.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium that is coupled to the at least one processor and that includes instructions, executable by the at least one processor;
   a housing;
   a clickpad holder; and
   at least one pivot coupling the housing and the clickpad holder;
   wherein the housing, the clickpad holder, and the at least one pivot are formed of a unitary material; and
   wherein the at least one pivot permits the clickpad holder to rotate relative to the housing.

2. The information handling system of claim 1, further comprising:
   a pad coupled to the clickpad holder.

3. The information handling system of claim 2, wherein the pad is formed of at least one of a Mylar material, glass, and a paint material.

4. The information handling system of claim 1, further comprising:
   a printed circuit board coupled to the clickpad and communicatively coupled to the at least one processor;
   wherein the printed circuit board includes circuitry that determines at least one position of at least one digit of a user, relative to the clickpad holder, and that provides, to the at least one processor, the at least one position of the at least one digit of the user; and
   wherein the instructions, when executed by the at least one processor, cause the information handling system to:
      receive data associated with the at least one position of the at least one digit of the user; and
      provide the data associated with the at least one position of the at least one digit of the user to an application executed by the at least one processor.

5. The information handling system of claim 4, wherein the printed circuit board is coupled to the clickpad via an adhesive material.

6. The information handling system of claim 5, wherein the polymer material includes at least one of an Acrylonitrile butadiene styrene (ABS) material, a thermoplastic polymer, and a thermosetting polymer.

7. The information handling system of claim 4, wherein the unitary material includes a polymer material.

8. The information handling system of claim 1, wherein the at least one pivot is formed of a plurality of pivot elements.

9. A method, comprising:
   injecting material into a mold for a housing of an information handling system through at least one cavity for at least one pivot and through a plurality of positions adjacent to a clickpad cavity to create a clickpad portion of the housing;
   creating a plurality of bridges at the plurality of positions that bind the clickpad portion of the housing to other portions of the housing; and
   removing the plurality of bridges to permit the clickpad portion of the housing to rotate about the at least one pivot.

10. The method of claim 9, wherein the removing the plurality of bridges includes cutting the plurality of bridges away from the clickpad portion of the housing.

11. The method of claim 9, wherein the removing the plurality of bridges includes burning the plurality of bridges away from the clickpad portion of the housing.

12. The method of claim 9, wherein the at least one cavity for the at least one pivot includes a plurality of cavities for a respective plurality of pivots.

13. The method of claim 9, further comprising:
   coupling a printed circuit board to a first side of the clickpad portion of the housing.

14. The method of claim 13, further comprising:
   coupling a pad to a second side of the clickpad portion of the housing.

15. The method of claim 14, wherein the pad includes at least one of a Mylar pad, a glass pad, and a paint material.

16. A housing of an information handling system, comprising:
   a clickpad holder; and
   at least one pivot coupling the housing and the clickpad holder;

wherein the housing, the clickpad holder, and the at least one pivot are formed of a unitary material; and wherein the at least one pivot permits the clickpad holder to rotate relative to the housing.

17. The housing of claim 16, wherein the unitary material includes a polymer material.

18. The housing of claim 16, wherein the polymer material includes at least one of an Acrylonitrile butadiene styrene (ABS) material, a thermoplastic polymer, and a thermosetting polymer.

19. The housing of claim 16, wherein the at least one pivot is formed of a plurality of pivot elements.

20. The housing of claim 16, wherein the at least one pivot is formed of a single pivot element.

* * * * *